United States Patent
Park et al.

(10) Patent No.: US 11,056,682 B2
(45) Date of Patent: Jul. 6, 2021

(54) POSITIVE ELECTRODE ACTIVE MATERIAL PARTICLE INCLUDING CORE INCLUDING LITHIUM COBALT OXIDE AND SHELL INCLUDING LITHIUM COBALT PHOSPHATE AND PREPARATION METHOD THEREOF

(71) Applicant: LG Chem, Ltd., Seoul (KR)

(72) Inventors: Younguk Park, Daejeon (KR); Chi Ho Jo, Daejeon (KR); Bo Ram Lee, Daejeon (KR); Sungbin Park, Daejeon (KR); Hyuck Hur, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 265 days.

(21) Appl. No.: 16/308,667

(22) PCT Filed: Jul. 27, 2017

(86) PCT No.: PCT/KR2017/008121
§ 371 (c)(1),
(2) Date: Dec. 10, 2018

(87) PCT Pub. No.: WO2018/097451
PCT Pub. Date: May 31, 2018

(65) Prior Publication Data
US 2019/0312260 A1    Oct. 10, 2019

(30) Foreign Application Priority Data

Nov. 22, 2016   (KR) .................. 10-2016-0155956

(51) Int. Cl.
*H01M 4/1315* (2010.01)
*H01M 4/13915* (2010.01)
(Continued)

(52) U.S. Cl.
CPC ......... *H01M 4/1315* (2013.01); *H01M 4/131* (2013.01); *H01M 4/136* (2013.01);
(Continued)

(58) Field of Classification Search
CPC .. H01M 4/1315; H01M 4/131; H01M 4/1397; H01M 4/136; H01M 4/1391;
(Continued)

(56) References Cited

U.S. PATENT DOCUMENTS 8,828,605 B2    9/2014   Lampe-Onnerud
2007/0292764 A1   12/2007  Soma et al.
(Continued)

FOREIGN PATENT DOCUMENTS

| CN | 101090152 A | 12/2007 | |
| CN | 103208648 | * 7/2013 | ........ H01M 10/0525 |

(Continued)

OTHER PUBLICATIONS

Machine translation of JP2012-094407, Fujiwara et al., 2012 (Year: 2012).*

(Continued)

*Primary Examiner* — Kwang Han
(74) *Attorney, Agent, or Firm* — Lerner, David, Littenberg, Krumholz & Mentlik, LLP

(57) ABSTRACT

Provided is a positive electrode active material particle including a core that includes lithium cobalt oxide represented by the following Chemical Formula 1; and a shell that is located on the surface of the core and includes lithium cobalt phosphate represented by the following Chemical Formula 2, wherein the shell has a tetrahedral phase:

$$Li_aCo_{(1-x)}M_xO_{2-y}A_y \quad (1)$$

wherein M is at least one of Ti, Mg, Zn, Si, Al, Zr, V, Mn, Nb, or Ni, A is oxygen-substitutional halogen, and $0.95 \leq a \leq 1.05$, $0 \leq x \leq 0.2$, $0 \leq y \leq 0.2$, and $0 \leq x+y \leq 0.2$, $$Li_bCoPO_4 \quad (2)$$

wherein $0 \leq b \leq 1$.

20 Claims, 3 Drawing Sheets

Olivine LiCoPO₄

Tetrahedral LiCoPO₄

(51) Int. Cl.
*H01M 4/36* (2006.01)
*H01M 4/525* (2010.01)
*H01M 10/0525* (2010.01)
*H01M 4/131* (2010.01)
*H01M 4/1397* (2010.01)
*H01M 4/136* (2010.01)
*H01M 4/1391* (2010.01)
*H01M 4/58* (2010.01)
*H01M 10/0567* (2010.01)
*H01M 4/02* (2006.01)
*H01M 10/052* (2010.01)

(52) U.S. Cl.
CPC ....... *H01M 4/1391* (2013.01); *H01M 4/1397* (2013.01); *H01M 4/13915* (2013.01); *H01M 4/364* (2013.01); *H01M 4/366* (2013.01); *H01M 4/525* (2013.01); *H01M 4/5825* (2013.01); *H01M 10/0525* (2013.01); *H01M 10/0567* (2013.01); *H01M 10/052* (2013.01); *H01M 2004/028* (2013.01); *H01M 2300/0025* (2013.01); *Y02E 60/10* (2013.01)

(58) Field of Classification Search
CPC ............... H01M 4/366; H01M 4/5825; H01M 10/0567; H01M 4/13915; H01M 4/364; H01M 4/525; H01M 10/0525; H01M 2300/0025; H01M 10/052; H01M 2004/028; Y02E 60/10; Y02P 70/50; C01P 2004/61; C01P 2006/40; C01P 2004/80; C01B 25/45; C01G 51/42
See application file for complete search history.

(56) References Cited

U.S. PATENT DOCUMENTS

| | | | |
|---|---|---|---|
| 2008/0003504 A1 | 1/2008 | Cho et al. | |
| 2008/0102369 A1 | 5/2008 | Sakata et al. | |
| 2010/0255369 A1 | 10/2010 | Hwang et al. | |
| 2011/0269023 A1 | 11/2011 | Kawakami et al. | |
| 2012/0003529 A1 | 1/2012 | Yamakaji | |
| 2012/0015250 A1 | 1/2012 | Teng et al. | |
| 2012/0077082 A1* | 3/2012 | Lee | H01M 4/0402 429/209 |
| 2012/0164319 A1* | 6/2012 | Lang | H01M 4/525 427/126.6 |
| 2013/0337329 A1 | 12/2013 | Oono et al. | |
| 2015/0104704 A1 | 4/2015 | Kim et al. | |
| 2015/0118561 A1 | 4/2015 | Gauthier et al. | |
| 2015/0125751 A1* | 5/2015 | Futamura | H01M 4/5825 429/221 |
| 2016/0197341 A1 | 7/2016 | Lu et al. | |
| 2016/0301104 A1 | 10/2016 | Shi et al. | |

FOREIGN PATENT DOCUMENTS

| | | | |
|---|---|---|---|
| CN | 103403932 A | 11/2013 | |
| CN | 104218218 A | 12/2014 | |
| CN | 104380506 A | 2/2015 | |
| CN | 105261736 A | 1/2016 | |
| CN | 106058240 A | 10/2016 | |
| JP | 2005276454 A | 10/2005 | |
| JP | 2007335331 A | 12/2007 | |
| JP | 2008108586 A | 5/2008 | |
| JP | 2010245020 A | 10/2010 | |
| JP | 2011249323 A | 12/2011 | |
| JP | 2012033478 A | 2/2012 | |
| JP | 2012-094407 * | 5/2012 | .......... H01M 10/052 |
| JP | 2012094407 A | 5/2012 | |
| KR | 100788257 B1 | 12/2007 | |
| KR | 20090074429 A | 7/2009 | |
| KR | 101511935 B1 | 4/2015 | |
| KR | 20160085783 A | 7/2016 | |
| WO | 2016049953 A1 | 4/2016 | |

OTHER PUBLICATIONS

Machine translation of CN 103208648, Huang et al., 2013 (Year: 2013).*
Extended European Search Report including the Written Opinion for Application No. EP 17874573.3 dated Jul. 3, 2019, pp. 1-8.
Search report from International Application No. PCT/KR2017/008121, dated Dec. 15, 2017.
Jähne, Carsten, et al., "A new LiCoPO4 polymorph via low temperature synthesis." Journal of Material Chemistry A, vol. 1, Received Aug. 29, 2012; Accepted Jan. 2, 2013, pp. 2856-2862.
Lee, Hyunjung, et al., "Olivine LiCoPO4 phase grown LiCoO2 cathode material for high densiy Li batteries." Electrochemistry Communictions, vol. 9, (2007) Received Aug. 7, 2006; Accepted Aug. 30, 2006; Available online Sep. 28, 2006, pp. 149-154.
Assat et al., Rapid Microwave-Assisted Solvothermal Synthesis of Non-Olivine Cmcm Polymorphs of LiMPO4 (M = Mn, Fe, Co, and Ni) at Low Temperature and Pressure, Inorganic Chemistry, Oct. 2015, pp. 10015-10022, vol. 54.
Baek et al., Unusual spin fluctuations and magnetic frustration in olivine and non-olivine LiCoPO4 detected by 31P and 7Li nuclear magnetic resonance, Physical Review B, Apr. 2014, pp. 134424-1-134424-6, vol. 89.
Chinese Search Report for Application No. 201780041818.X, dated Jan. 14, 2021, pp. 1-4.

* cited by examiner

POSITIVE ELECTRODE ACTIVE MATERIAL PARTICLE INCLUDING CORE INCLUDING LITHIUM COBALT OXIDE AND SHELL INCLUDING LITHIUM COBALT PHOSPHATE AND PREPARATION METHOD THEREOF

CROSS-REFERENCE TO RELATED APPLICATIONS

The present application is a national phase entry under 35 U.S.C. § 371 of International Application No. PCT/KR2017/008121 filed on Jul. 27, 2017, and which claims priority from Korean Patent Application No. 10-2016-0155956, filed on Nov. 22, 2016, the disclosures of which are hereby incorporated by reference.

TECHNICAL FIELD

The present invention relates to a positive electrode active material particle including a core including lithium cobalt oxide and a shell including lithium cobalt phosphate, and a preparation method thereof.

BACKGROUND ART

In recent years, a demand for environment-friendly alternative energy sources has become an indispensable factor for the future, as the price increase of energy sources due to depletion of fossil fuels and the interest in environmental pollution are amplified. For this reason, a variety of electric power generation technologies such as nuclear power, solar power, wind power, tidal power, etc. have been continuously studied, and energy storage devices for more efficient use of generated energy have also been attracting much attention.

Particularly, as technology development and demands for mobile devices increase, demands for batteries as energy sources are rapidly increasing. Recently, use of a secondary battery as a power source for an electric vehicle (EV), a hybrid electric vehicle (HEV), etc. has been realized, and its application area has also been expanded to use as an auxiliary power source through a grid. Therefore, many researches on batteries meeting diverse demands have been conducted.

In terms of the shape of the battery, there are high demands for a prismatic type secondary battery and a pouch type secondary battery which have a thin thickness to be applicable in products such as a cellular phone, etc. In terms of materials, there are high demands for lithium secondary batteries such as a lithium ion battery and a lithium ion polymer battery which have advantages of high energy density, discharge voltage, and output power stability.

As a positive electrode material for the lithium secondary battery, $LiCoO_2$, a ternary system material (NMC/NCA), $LiMnO_4$, $LiFePO_4$, etc. is currently used. Of them, $LiCoO_2$ has problems in that cobalt is expensive and $LiCoO_2$ has low capacity at the same voltage, as compared with ternary system materials. Therefore, use of ternary system materials is gradually increasing in order to increase the capacity of secondary batteries.

However, $LiCoO_2$ has been widely used until now, because it has advantages of high rolling density, etc. To develop high-capacity secondary batteries, studies are conducted to increase an operating voltage.

When a high voltage is applied to lithium cobalt oxide, more particularly, a high voltage of to 4.45 V or higher is applied thereto in order to achieve high capacity, there are problems in that Li usage of $LiCoO_2$ is increased to make the surface unstable, and side reactions with an electrolyte occur to generate gas, resulting in a reduction of stability such as a swelling phenomenon, etc., an increase of possibility of structural instability, and a rapid reduction of lifespan property.

To solve these problems, a technology of forming a coating layer including a metal such as Al, Ti, Mg, or Zr on the surface of $LiCoO_2$ is generally used. However, the coating layer composed of the metal interrupts movement of Li ions during charge/discharge cycling, and therefore, there is a problem that performances of the secondary batteries may deteriorate.

Accordingly, it is necessary to develop a lithium cobalt oxide-based positive electrode active material which may be stably used at high voltages.

DISCLOSURE

Technical Problem

An object of the present invention is to solve the above-described problems of the prior art and the technical problems which have been demanded to be solved.

The present inventors have conducted intensive studies and various experiments, and as described below, they found that when a positive electrode active material particle includes a core that includes lithium cobalt oxide; and a shell that is coated on the surface of the core and includes lithium cobalt phosphate with a tetrahedral phase, reactions with an electrolyte are remarkably reduced, release of Co ions is reduced due to a strong P—O bond, and changes of the surface structure are inhibited under a high voltage due to a high operating voltage of lithium cobalt phosphate in the shell, and as a result, stability and lifespan property may be improved, and movement of lithium ions through the shell may be allowed to effectively prevent deterioration of a rate property of a secondary battery which is caused by formation of a coating layer, thereby completing the present invention.

Technical Solution

To achieve the above object, a positive electrode active material particle according to the present invention is characterized by including a core that includes lithium cobalt oxide represented by the following Chemical Formula 1; and a shell that is located on the surface of the core and includes lithium cobalt phosphate represented by the following Chemical Formula 2, wherein the shell has a tetrahedral phase:

$$Li_aCo_{(1-x)}M_xO_{2-y}A_y \qquad (1)$$

wherein M is at least one of Ti, Mg, Zn, Si, Al, Zr, V, Mn, Nb, or Ni, A is oxygen-substitutional halogen, and 0.95–a≤1.05, 0≤x≤0.2, 0≤y≤0.2, and 0≤x+y≤0.2,

$$Li_bCoPO_4 \qquad (2)$$

wherein 0≤b≤1, particularly, 0≤b≤1.

In general, when lithium cobalt oxide is used as a positive electrode active material at a high voltage, there are problems in that a large amount of lithium ions are released from lithium cobalt oxide particles to destroy a crystal structure, and the resulting unstable crystal structure is broken down, and eventually, the reversibility of the structure is reduced. In addition, when $Co^{3+}$ or $Co^{4+}$ ions present on the surface of lithium cobalt oxide particles are reduced by an electrolyte in a state where lithium ions are released, oxygen is removed from the crystal structure, and the above breaking of the structure is further promoted.

Therefore, in order to stably use lithium cobalt oxide at a high voltage, side reactions between the cobalt ions and the electrolyte should be suppressed while stably maintaining the crystal structure even though a large amount of lithium ions are released.

Accordingly, in the present invention, intensive studies have been conducted, and as a result, it was confirmed that, as described above, by including the shell including lithium cobalt phosphate, the oxidation number of Co ion of the shell is maintained at +3 or less, and therefore, reactions with an electrolyte are remarkably reduced, release of Co ions is reduced due to a strong P—O bond, and changes of the surface structure are inhibited under a high voltage due to a high operating voltage of lithium cobalt phosphate in the shell, and therefore, stability and lifespan property may be improved, and movement of lithium ions through the shell may be allowed to effectively prevent deterioration of a rate property of a secondary battery which is caused by formation of a coating layer.

In one specific embodiment, a weight of the shell relative to a weight of the core may be 0.1% by weight to 3.0% by weight.

When the weight of the shell relative to the weight of the core is less than 0.1% by weight, the ratio of the shell in the positive electrode active material particle is excessively low, and thus desired effects may not be sufficiently achieved. On the contrary, when the weight of the shell relative to the weight of the core is more than 3.0% by weight, the ratio of the shell in the positive electrode active material particle is excessively high, and thus there is a problem in that the overall capacity of the positive electrode active material may be relatively reduced.

Based on the size of the positive electrode active material particle, an average particle size (D50) of lithium cobalt oxide which is the core may be 5 micrometer to 25 micrometer, and a thickness of the shell may be 1 Å to 1 μm, specifically, 5 nanometer to 100 nanometer.

Here, the average particle diameter (D50) (50% diameter of soil particle) indicates a particle diameter corresponding to 50% of passed mass percentage in a grain size accumulation curve. D50 values may be determined by obtaining powder distribution based on volume using Microtrac (S-3500), and the thickness of the shell may be determined by comparing the particle diameter of the final positive electrode active material and the particle diameter of lithium cobalt oxide.

Outside the above range, when the average particle diameter (D50) of the lithium cobalt oxide is less than 5 micrometer, it is not easy to control the lithium cobalt oxide particles, and thus there is a difficulty in the process. When the average particle diameter (D50) of the lithium cobalt oxide is more than 25 micrometer, there is a loss in terms of rolling density, capacity, etc., which is not preferable. The thickness of the shell corresponds to the description of the weight ratio of the core and the shell.

Further, the shell may be formed on the area of 50% to 100% with respect to the surface area of the core.

Outside the above range, when the shell may be coated on the area of less than 50% with respect to the surface area of the core, the coating area of the shell is too small, and thus the desired effects may not be sufficiently achieved, which is not preferable.

Meanwhile, when the coating layer is formed by a general solid phase reaction, the lithium cobalt phosphate has an olivine phase. However, the present inventors revealed that it is more preferable that the shell has a tetrahedral phase in order to further improve the effects of the present invention.

Specifically, the crystal structure of the lithium cobalt phosphate is as illustrated in FIG. 1.

Referring to FIG. 1, $PO_4$ and $CoO_4$ are represented by polygons, and Li ions are represented by small circles. In this regard, in the lithium cobalt phosphate having the olivine phase, there are many regions where $PO_4$ and $CoO_4$ entirely overlap. In contrast, in the lithium cobalt phosphate having the tetrahedral phase, there are many regions where $PO_4$ and $CoO_4$ share corners and are alternately arranged. It is expected/confirmed that the lithium cobalt phosphate having the tetrahedral phase has high ionic conductivity due to a more open structure with many voids, as compared with the lithium cobalt phosphate having the olivine phase.

Accordingly, when the lithium cobalt phosphate having the tetrahedral phase is included as the shell, the effect of more excellent ionic conductivity may be achieved.

Further, the lithium cobalt phosphate having the tetrahedral phase may undergo a phase transfer to the olivine phase under high temperature environment, for example, at a temperature of 220° C. or higher. The lithium cobalt phosphate having the olivine phase has lower ionic conductivity. Therefore, by decreasing the ionic conductivity of the shell under high temperature environment, smaller leakage current flows in the internal short circuit to improve the high-temperature stability.

Furthermore, the lithium cobalt phosphate of the shell having the tetrahedral phase has low coulombic efficiency in the electrochemical reaction by $Co^{2+}/Co^{3+}$ redox coupling under high voltage environment, for example, 4.9 V or higher, as compared with the lithium cobalt phosphate having the olivine phase. Therefore, the battery operation is stopped by rapid depletion of the electrolyte, thereby inhibiting an oxygen release phenomenon which is caused by lithium deintercalation in the lithium cobalt oxide of the core during overcharging. As a result, the effect of improving battery safety may also be achieved.

Meanwhile, the positive electrode active material particle may further include a coating layer including a metal, specifically, Al, wherein the coating layer may be $Al_2O_3$, and a coating thickness of the coating layer including the metal may be 5 nm to 100 nm.

Further, the present invention provides a method of preparing the positive electrode active material particle, the method including:

(i) preparing a mixed solution in which a cobalt source, a phosphorus source, and a lithium source are mixed;

(ii) adding lithium cobalt oxide in a particle state to the mixed solution, followed by mixing; and (iii) performing a hydrothermal reaction of the solution of the process (ii) at a high temperature and a high pressure.

In other words, the shell of the positive electrode active material particle may be prepared by hydrothermal synthesis. Thus, when the shell is formed on the surface of the core, the shell layer may be formed by using the mixed solution in which the sources for forming the shell are mixed all at once, and reacting the materials in water at a high temperature and a high pressure. In this case, the shell of lithium cobalt phosphate which is formed on the surface of lithium cobalt oxide by the hydrothermal reaction may have the tetrahedral phase.

Here, the hydrothermal reaction is performed in the presence of water at a high temperature and a high pressure. Specifically, the hydrothermal reaction of the process (iii)

may be performed at a high temperature of 200° C. to 400° C. and a high pressure of 1 bar to 10 bar for 5 minutes to 20 minutes.

Basically, water is not used as a solvent in a high-temperature reaction, but it is possible at such a high pressure as described above. In this regard, the reaction may be generally carried out in an autoclave.

Outside the above range, when the temperature and the pressure are too high or the reaction is carried out for a long time, the amount of the shell having the tetrahedral phase with low coulombic efficiency becomes excessive, and therefore, there is a problem that capacity is reduced when the battery is driven. When the temperature and the pressure are too low or the reaction time is too short, the tetrahedral phase is incompletely generated to interfere with the lithium ion movement between the core portion of the lithium cobalt oxide and the electrolyte, and therefore, the output is lowered when the battery is driven, which is not preferable.

In one specific embodiment, a kind of the cobalt source is not limited, but the cobalt source may be specifically cobalt oxide, cobalt nitride, or cobalt acetate, and more specifically, $Co_3O_4$, $Co(NO_3)_3$, or $Co(CH_3COO)_3$.

A kind of the phosphorus source is not limited, but the phosphorus source may be phosphoric acid or salts thereof, specifically, $H_3PO_4$ or $(NH_4)_2HPO_4$. A kind of the lithium source is also not limited, but the lithium source may be specifically lithium hydroxide or lithium carbonate.

Meanwhile, in the process (i), a mixing ratio of the sources in the mixture may be determined according to a composition of the lithium cobalt phosphate to be prepared, and the lithium cobalt oxide added to the mixed solution in the process (ii) may be mixed so that a weight ratio of the lithium cobalt phosphate to the lithium cobalt oxide in the positive electrode active material particle prepared by the hydrothermal reaction becomes 0.1% by weight to 3.0% by weight.

Further, the present invention provides a secondary battery including a positive electrode including the positive electrode active material particle, a negative electrode, and an electrolyte. A kind of the secondary battery is not particularly limited, but specific examples thereof may include lithium secondary batteries, such as a lithium ion battery, a lithium ion polymer battery, etc., which have advantages of high energy density, discharge voltage, output power stability, etc.

Generally, the lithium secondary battery consists of a positive electrode, a negative electrode, a separator, and a non-aqueous electrolyte containing lithium salts.

The positive electrode may be manufactured by, for example, applying a mixture of the positive electrode active material particles, a conductive material, and a binder onto a positive electrode collector, and then drying it. If necessary, a filler may be further added to the mixture.

The positive electrode collector is generally fabricated in a thickness of 3 μm to 500 μm. The positive electrode collector is not particularly limited as long as it has high conductivity without causing chemical changes in the corresponding battery. The positive electrode collector may be, for example, any one selected from stainless steel, aluminum, nickel, titanium, fired carbon, or aluminum or stainless steel that is surface-treated with carbon, nickel, titanium, or silver. The collector may have fine roughness on the surface thereof so as to reinforce adhesion of the positive electrode active material. The collector may be in a variety of forms such as a film, a sheet, a foil, a net, a porous material, a foamed material, a non-woven fabric material, etc.

The conductive material is generally added in an amount of 1% by weight to 30% by weight based on the total weight of the mixture including the positive electrode active material. The conductive material is not particularly limited, as long as it has conductivity without causing chemical changes in the corresponding battery. Examples of the conductive material may include graphite such as natural or artificial graphite; carbon black such as carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; polyphenylene derivatives, etc.

The binder is a component that assists in bonding between the active material and the conductive material and bonding with respect to the collector, and may be generally added in an amount of 1% by weight to 30% by weight based on the total weight of the mixture including the positive electrode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc.

The filler is a component optionally used to inhibit expansion of the positive electrode. The filler is not particularly limited, as long as it is a fibrous material without causing chemical changes in the corresponding battery. For example, olefinic polymers such as polyethylene, polypropylene, etc.; and fibrous materials such as glass fibers, carbon fibers, etc. may be used.

The negative electrode may be fabricated by applying a negative electrode active material onto a negative electrode collector and drying it. If necessary, the above-described components may be further included, optionally.

The negative electrode collector may be generally fabricated in a thickness of 3 μm to 500 μm. This negative electrode collector is not particularly limited, as long as it has conductivity without causing chemical changes in the corresponding battery. For example, the negative electrode collector may include copper, stainless steel, aluminum, nickel, titanium, fired carbon, or copper or stainless steel surface-treated with carbon, nickel, titanium, silver, etc., aluminum-cadmium alloy, etc. Like the positive electrode collector, the negative electrode collector may have fine roughness on the surface thereof so as to reinforce adhesion of the negative electrode active material, and may be used in a variety of forms such as a film, a sheet, a foil, a net, a porous material, a foamed material, a non-woven fabric material, etc.

The negative electrode active material may include, for example, carbon such as non-graphitized carbon, graphitized carbon, etc.; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group I, II, or III elements of the periodic table, halogen; $0 \leq x \leq 1$; $1 \leq y \leq 3$; $1 \leq z \leq 8$), etc.; lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, etc.; conductive polymers such as polyacetylene, etc.; Li—Co—Ni-based materials, etc.

The separator is interposed between the positive electrode and the negative electrode. As the separator, an insulating thin film having high ion permeability and mechanical strength is used. The separator generally has a pore diameter of 0.01 µm to 10 µm and a thickness of 5 µm to 300 µm. As the separator, for example, a sheet or non-woven fabric made of olefin polymer, such as polypropylene having chemical resistance and hydrophobicity, etc.; or a glass fiber or polyethylene is used. When a solid electrolyte such as a polymer, etc. is employed as the electrolyte, the solid electrolyte may also serve as both the separator and the electrolyte.

Further, in one specific embodiment, in order to improve safety of the battery of high energy density, the separator may be an organic/inorganic composite porous SRS (Safety-Reinforcing Separators).

The SRS separator may be manufactured by applying an active layer, including inorganic particles and a binder polymer, onto a polyolefin-based separator substrate. In this case, the SRS separator has a pore structure which is included in the separator substrate as well as a uniform pore structure which is formed by the interstitial volume among inorganic particles as active layer ingredients.

Compared to use of a common separator, use of the organic/inorganic composite porous separator is advantageous in that increase of the battery thickness according to swelling during a formation process may be inhibited. In the case where a gellable polymer is used as a binder polymer component when a liquid electrolyte is impregnated, the organic/inorganic composite porous separator may also serve as an electrolyte.

Further, since the organic/inorganic composite porous separator may exhibit excellent adhesion property by controlling the contents of inorganic particles and binder polymer which are active layer components present in the separator, a battery assembly process may be easily performed.

The inorganic particles are not particularly limited, as long as they are electrochemically stable. That is, the inorganic particles that may be used in the present invention are not particularly limited, as long as the inorganic particles are not oxidized and/or reduced within an operating voltage range (e.g., 0 to 5 V based on Li/Li+) of a battery to which inorganic particles are applied. In particular, when inorganic particles having ion transfer ability are used, it is possible to improve ion conductivity in an electrochemical element, thereby improving the performance of the battery. Accordingly, it is preferable that ion conductivity of the inorganic particles is as high as possible. In the case of inorganic particles having high density, there is a difficulty in dispersing the inorganic particles at the time of coating, and there is a problem that the weight of the battery may increase. For these reasons, it is preferable that density of the inorganic particles is as low as possible. Additionally, in the case of inorganic particles having high permittivity, a degree of dissociation of electrolyte salts, such as lithium salts, in a liquid electrolyte may increase, thereby improving ion conductivity of the electrolyte.

The lithium salt-containing non-aqueous electrolyte is composed of a polar organic electrolyte and lithium salt. A non-aqueous liquid electrolyte, an organic solid electrolyte, or an inorganic solid electrolyte may be used as the electrolyte.

The non-aqueous liquid electrolyte may be, for example, a non-protic organic solvent, such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing ionic dissociation groups, etc.

The inorganic solid electrolyte may include, for example, Li-based nitrides, halides, or sulfates such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

The lithium salts are substance that are readily dissolved in the non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroboran lithium, lower aliphatic carboxylic acid lithium, lithium tetraphenyl borate, imides, etc.

Further, the lithium salt-containing non-aqueous electrolyte may include electrolyte additives, and the electrolyte additives may include at least one of ethylene carbonate, vinyl acetate, vinyl ethylene carbonate, thiophene, 1,3-propane sultone, succinic anhydride, or dinitrile additive. The dinitrile additive may be at least one of malononitrile, succinonitrile, glutaronitrile, adiponitrile, or phthalonitrile. Here, the dinitrile additive may be included in an amount of 5% by weight or less based on the total weight of the electrolyte.

In order to improve charge/discharge characteristics and flame retardancy, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethyleneglycol dialkylether, ammonium salts, pyrrol, 2-methoxy ethanol, aluminum trichloride, etc. may be added. Optionally, halogen-containing solvents such as carbon tetrachloride or ethylene trifluoride may be further added in order to provide flame resistance, or carbon dioxide gas may be further added in order to enhance high-temperature retention properties.

Further, the present invention provides a battery pack including the secondary battery, and a device including the battery pack. The above battery pack and device are known in the art, and therefore, specific descriptions thereof will be omitted in the present invention.

DETAILED DESCRIPTION OF THE EMBODIMENTS

Figure 1:
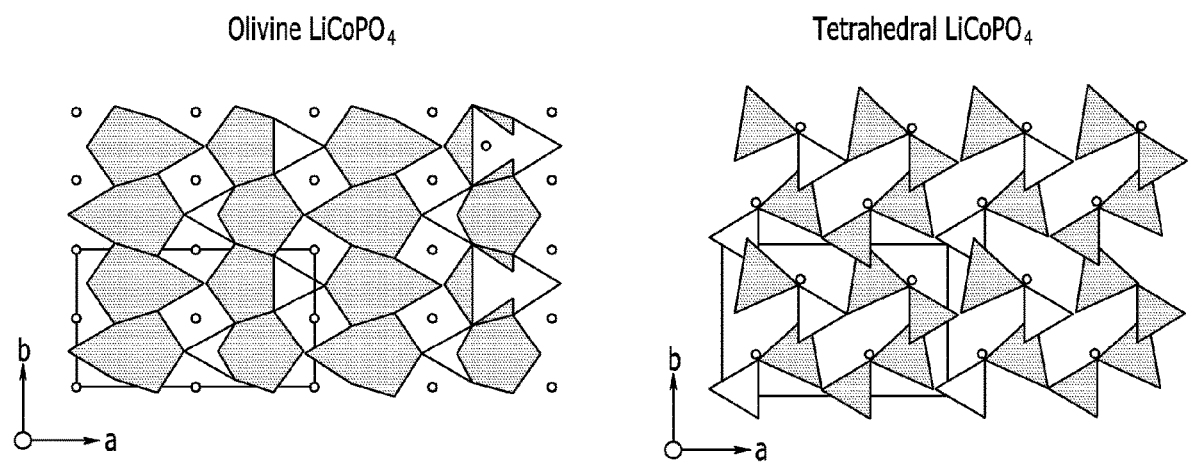
FIG. 1 illustrates a comparison of crystal structures of lithium cobalt phosphate.

Hereinafter, the present invention will be described in more detail with reference to Examples of the present invention. However, the scope of the present invention is not limited thereby.

Example 1

LiCoO$_2$, of which particle diameter was distributed in the range of 10 micrometer to 20 micrometer, was prepared in a particle state. 50 g of LiCoO$_2$ in a particle state was mixed and dispersed in 50 ml of a solution in which 0.26 g of CH$_3$COOLi.2H$_2$O, 0.96 g of (CH$_3$COO)$_3$Co.4H$_2$O, and 0.41 g of (NH$_4$)$_2$HPO$_4$ were dissolved in DI water at a weight ratio of 1(source):30(DI water), and the temperature was raised to 220° C. for 10 minutes and maintained at a pressure of 5 bar for 5 minutes to carry out heat-treatment, thereby preparing positive electrode active material particles wherein a core and a shell were formed at a weight ratio of core:shell of 100:1 and lithium cobalt phosphate with a tetrahedral phase was coated on the surface of lithium cobalt oxide at a thickness of 10 nanometer to 100 nanometer.

Example 2

Positive electrode active material particles were prepared in the same manner as in Example 2, except that a core and a shell were formed at a weight ratio of core:shell of 100:3.

Example 3

Positive electrode active material particles were prepared in the same manner as in Example 2, except that a core and a shell were formed at a weight ratio of core:shell of 100:5.

Comparative Example 1

Positive electrode active material particles were prepared in the same manner as in Example 1, except that a shell including Al$_2$O$_3$ was formed on the surface of lithium cobalt oxide using an Al(OH)$_3$ aqueous solution.

Comparative Example 2

LiCoO$_2$, of which particle diameter was distributed in the range of 10 micrometer to 20 micrometer, was prepared in a particle state. A solution was prepared by dissolving 1.26 g of Co(NO$_3$)$_3$.9H$_2$O, 0.41 g of (NH$_4$)$_2$HPO$_4$, and 0.07 g of LiOH in DI water. In 500 ml of this solution, 50 g of LiCoO$_2$ in a particle state was mixed, dispersed, filtered, and dried under vacuum to recover powder. The recovered powder was heat-treated at 900° C. for 5 hours, thereby preparing positive electrode active material particles wherein a core and a shell were formed at a weight ratio of core:shell of 100:1 and lithium cobalt phosphate with an olivine phase was coated on the surface of lithium cobalt oxide at a thickness of 10 nanometer to 100 nanometer.

Experimental Example 1

Each of the positive electrode active material particles prepared in Examples 1 to 3 and Comparative Examples 1 to 2 was used as a positive electrode active material, PVdF was used as a binder, and natural graphite was used as a conductive material. The positive electrode active material:binder:conductive material at a weight ratio of 96:2:2 were mixed well in NMP, and this mixture was applied to Al foil with a thickness of 20 μm, and dried at 130° C. to manufacture a positive electrode. As a negative electrode, lithium foil was used, and an electrolyte containing 1 M LiPF$_6$ in a solvent of EC:DMC:DEC=1:2:1 was used to manufacture a coin-type half cell.

The coin-type half cells thus manufactured were used to examine output properties (rate properties) at 2.0 C/0.2 C, and the results are shown in Table 1 below. C-rate was measured by setting 1 C as 40 mA. Charge-discharge performance was conducted between 2.5 V and 4.5 V under the CC-CV (charge) and CC (discharge) mode.

TABLE 1

| Output property | Example 1 | Example 2 | Example 3 | Comparative Example 1 | Comparative Example 2 |
|---|---|---|---|---|---|
| 2.0 C/0.2 C discharge capacity (%) | 94.5 | 94.2 | 94.0 | 93.8 | 89.0 |

Referring to Table 1, the battery according to Example 1, wherein the lithium cobalt oxide coated with LiCoPO$_4$ having the tetrahedral phase was used as the positive electrode active material, showed the most excellent output properties. Moreover, the battery according to Comparative Example 2, wherein the lithium cobalt oxide coated with LiCoPO$_4$ having the olivine phase was used as the positive electrode active material, showed poorer output properties than the battery including lithium cobalt oxide coated with Al$_2$O$_3$.

These results suggest that the tetrahedral phase shows excellent ionic conductivity, because it has a more open structure than the olivine phase.

Experimental Example 2

Each of the positive electrode active material particles prepared in Example 1 and Comparative Examples 1 to 2 was used as a positive electrode active material, PVdF was used as a binder, and natural graphite was used as a conductive material. The positive electrode active material:binder:conductive material at a weight ratio of 96:2:2 were mixed well in NMP, and this mixture was applied to Al foil with a thickness of 20 μm, and dried at 130° C. to manufacture a positive electrode.

Artificial graphite, PVd, and carbon black at a weight ratio of 96:2:2 were mixed well in NMP, and this mixture was applied to Cu foil with a thickness of 20 μm, and dried at 130° C. to manufacture a negative electrode.

A separator (Celgard) was interposed between the positive electrode and the negative electrode to construct an electrode assembly, which was mounted in a pouch-type battery case, and an electrolyte containing 1 M LiPF$_6$ in a solvent of EC:DMC:DEC=1:2:1 was used to manufacture each battery cell.

An ARC test was performed by simultaneously measuring temperature change, voltage, and current change of the battery cells thus manufactured using an accelerating rate calorimeter under the charging condition of 4.4 V, and the results of measuring the onset time of the thermal runaway temperature, at which the temperature of the battery cell uncontrollably increased, are shown in the following Table 2 and FIG. 2.

TABLE 2

| ARC test | Example 1 | Comparative Example 1 | Comparative Example 2 |
|---|---|---|---|
| Onset time of thermal runaway (min) | 888 | 725 | 755 |

Figure 2:
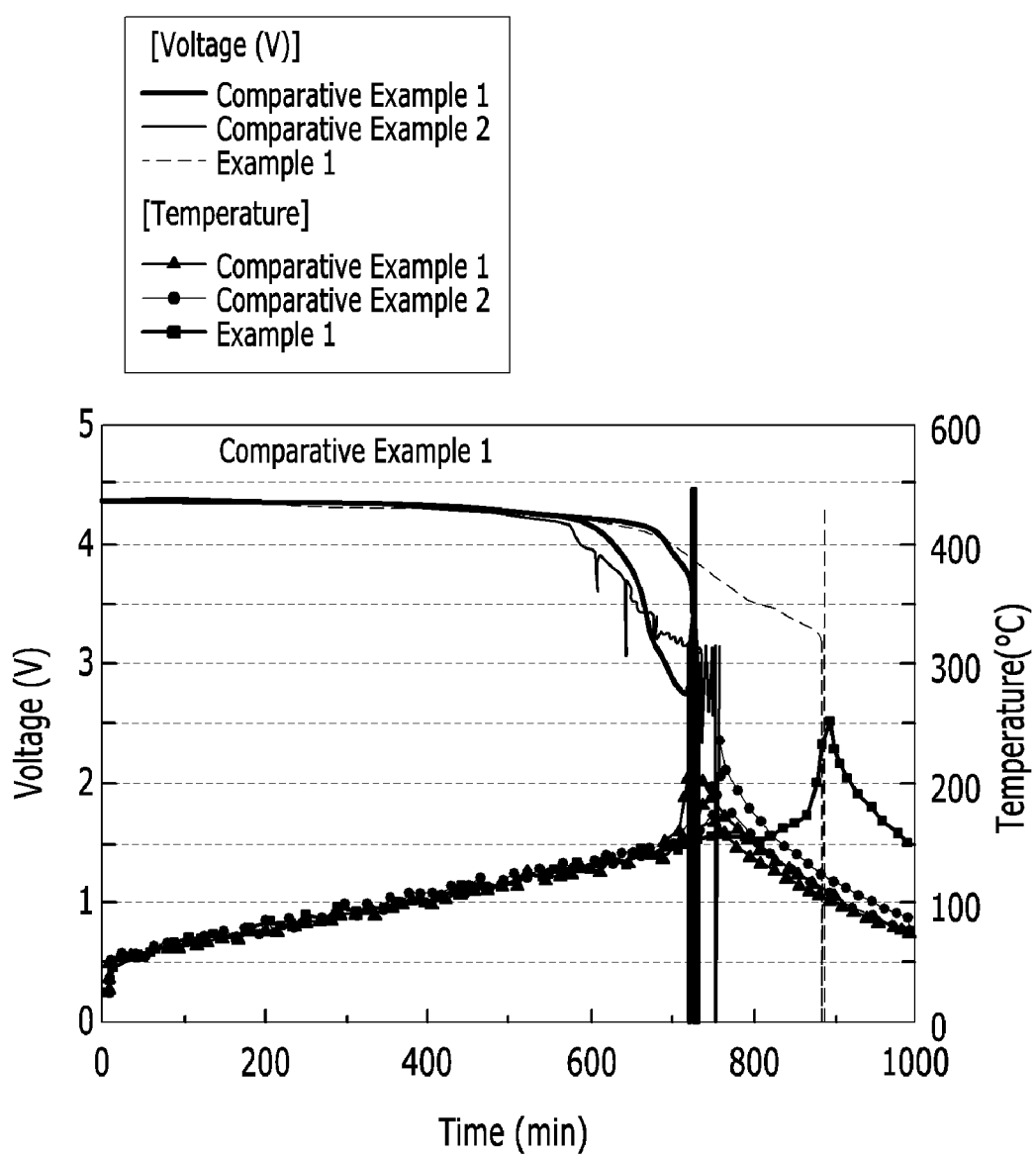
FIG. 2 shows ARC test results according to Experimental Example 2 of the present invention.

Referring to Table 2 and FIG. 2, it was confirmed that the battery of Example 1 using the positive electrode active material particles according to the present invention showed slow thermal runaway, indicating more excellent high-temperature stability.

It is because $Al_2O_3$ coating (Comparative Example 1) is sparsely formed in a particle shape on the surface of lithium cobalt oxide, lithium ions relatively freely move to the core-shell electrolyte, and thus there is little effect of reducing ionic conductivity in the shell, and as a result, thermal runaway occurs most rapidly, whereas $LiCoPO_4$ coating, regardless of olivine phase or tetrahedral phase, basically has the effect of reducing lithium ionic conductivity in the shell, and thus the onset of thermal runaway is delayed. However, like the $Al_2O_3$ coating, the $LiCoPO_4$ coating of the olivine phase (Comparative Example 2) is sparsely formed in a particle shape on the surface of lithium cobalt oxide, and thus the effect of reducing ionic conductivity in the shell is less than that of Example 1, whereas the $LiCoPO_4$ coating of the tetrahedral phase (Example 1) forms a coating layer by hydrothermal reaction to form a much more compact coating layer than the wet coating method used in Comparative Example 1 and Comparative Example 2, and as a result, lithium ionic conductivity in the shell is greatly reduced and small leakage current flows in the internal short circuit.

Experimental Example 3

Each of the positive electrode active material particles prepared in Example 1 and Comparative Examples 1 to 2 was used as a positive electrode active material, PVdF was used as a binder, and natural graphite was used as a conductive material. The positive electrode active material:binder:conductive material at a weight ratio of 96:2:2 were mixed well in NMP, and this mixture was applied to Al foil with a thickness of 20 µm, and dried at 130° C. to manufacture a positive electrode.

Artificial graphite, PVdF, and carbon black at a weight ratio of 96:2:2 were mixed well in NMP, and this mixture was applied to Cu foil with a thickness of 20 µm, and dried at 130° C. to manufacture a negative electrode.

A separator (Celgard) was interposed between the positive electrode and the negative electrode to construct an electrode assembly, which was mounted in a pouch-type battery case, and an electrolyte containing 1 M $LiPF_6$ in a solvent of EC:DMC:DEC=1:2:1 was used to manufacture each battery cell.

Figure 3:
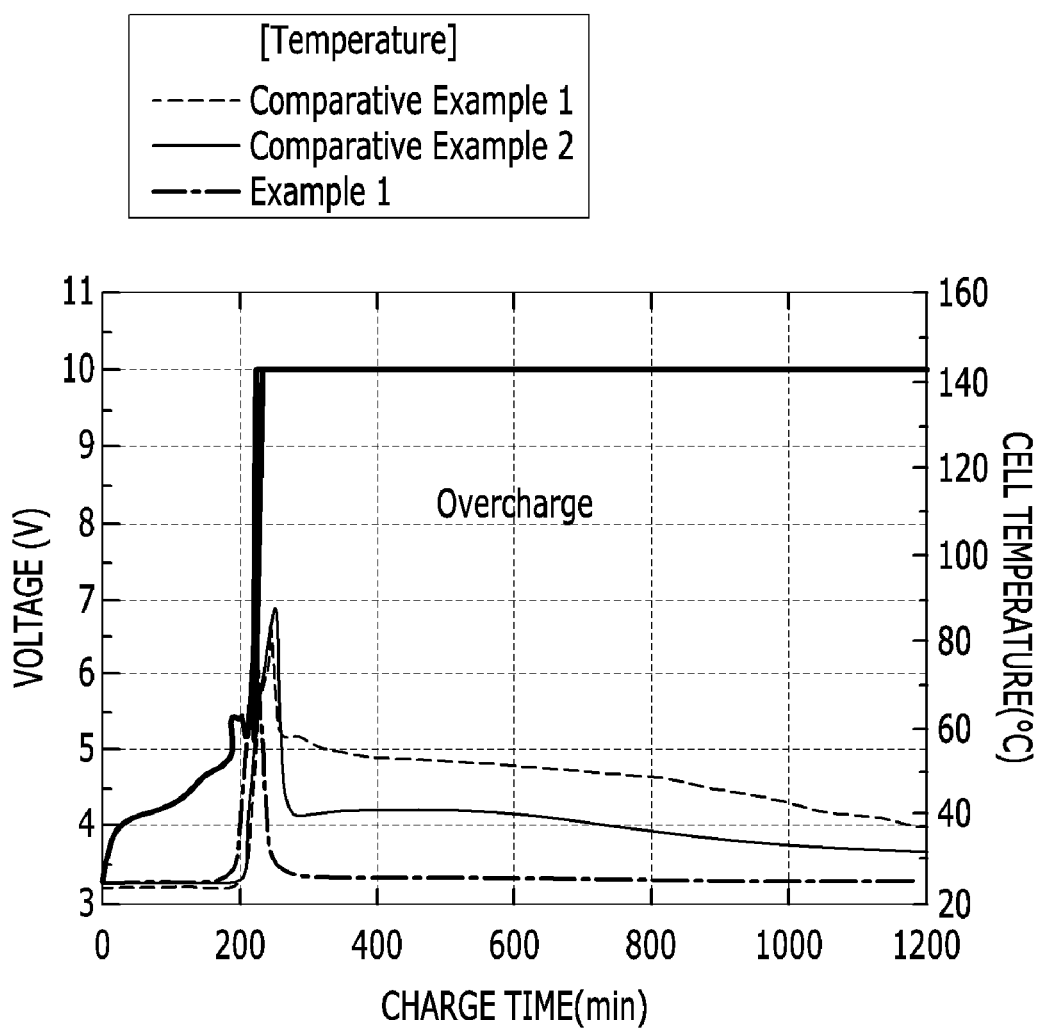
FIG. 3 shows safety test results according to Experimental Example 3 of the present invention.

The battery cells thus manufactured was overcharged in CC/CV charging mode of an upper voltage limit of 4.55 V for 24 hours, and temperature changes of the cells were compared, and the results are shown in FIG. 3.

Referring to FIG. 3, the cell temperature of the battery using the active material particles of Example 1 according to the present invention was maintained low, as compared with those of the batteries using the active material particles of Comparative Examples 1 and 2, indicating higher high-voltage stability.

It is because the cobalt ions in the lithium cobalt phosphate with the tetrahedral phase has low coulombic efficiency in the oxidation-reduction reaction under high-voltage environment, as compared with $Al_2O_3$-coated $LiCoO_2$ (Comparative Example 1) and lithium cobalt phosphate with the olivine phase (Comparative Example 2), and therefore, the battery operation is stopped by rapid depletion of the electrolyte before occurrence of an oxygen release phenomenon caused by excessive deintercalation of Li. Particularly, the $Al_2O_3$ coating of Comparative Example 1 does not participate in the oxidation-reduction reaction under high-voltage environment not to greatly contribute to prevention of overcharging.

Although the present invention has been described in connection with the exemplary embodiments of the present invention, it will be apparent to those skilled in the art that various modifications and changes may be made thereto without departing from the scope and spirit of the invention.

[Industrial Availability]

As described above, the positive electrode active material particles according to the present invention may include a core that includes lithium cobalt oxide; and a shell that is coated on the surface of the core and includes lithium cobalt phosphate with a tetrahedral phase. As compared with existing positive electrode active material particles including lithium cobalt oxide, the oxidation number of Co ion of the shell is maintained at +3 or less, and therefore, reactions with an electrolyte are remarkably reduced to prevent a problem of stability reduction such as a swelling phenomenon due to gas generation, release of Co ions is reduced due to a strong P—O bond, and changes of the surface structure are inhibited under a high voltage due to a high operating voltage of lithium cobalt phosphate included in the shell, and therefore, structural stability of the positive electrode active material particles may be improved and lifespan property of a secondary battery may be also improved, and movement of lithium ions through the shell may be allowed to effectively prevent deterioration of a rate property of a secondary battery which is caused by formation of a coating layer.

Further, since the shell of the positive electrode active material particles according to the present invention has a tetrahedral phase, it may have excellent ionic conductivity due to a more open structure with many voids, as compared with the lithium cobalt phosphate having an olivine phase. Further, since the shell may undergo a phase transfer to the olivine phase under high temperature environment, the ionic conductivity of the shell may be decreased, and thus smaller leakage current flows in the internal short circuit to improve the high-temperature stability. Furthermore, since the shell has low coulombic efficiency in the oxidation-reduction reaction of cobalt ions under high-voltage environment, as compared with lithium cobalt phosphate having the olivine phase, the battery operation is stopped by rapid depletion of the electrolyte before occurrence of an oxygen release phenomenon caused by excessive deintercalation of Li. There is also an effect of improving safety.

The invention claimed is:

1. A positive electrode active material particle comprising a core that includes lithium cobalt oxide represented by the following Chemical Formula 1; and
a tetrahedral phase shell that is located on a surface of the core and includes lithium cobalt phosphate represented by the following Chemical Formula 2:

$$Li_aCo_{(1-x)}M_xO_{2-y}A_y \quad (1)$$

wherein M is at least one of Ti, Mg, Zn, Si, Al, Zr, V, Mn, Nb, or Ni, A is oxygen-substitutional halogen, and $0.95 \leq a \leq 1.05$, $0 \leq x \leq 0.2$, $0 \leq y \leq 0.2$, and $0 \leq x+y \leq 0.2$, $$Li_bCoPO_4 \qquad (2)$$

wherein $0 \leq b \leq 1$.

2. The positive electrode active material particle of claim 1, wherein a weight of the tetrahedral phase shell relative to a weight of the core is 0.1% by weight to 3.0% by weight.

3. The positive electrode active material particle of claim 1, wherein an average particle diameter (D50) of the lithium cobalt oxide is 5 micrometer to 25 micrometer.

4. The positive electrode active material particle of claim 1, wherein a thickness of the tetrahedral phase shell is 1 Å to 1 µm.

5. The positive electrode active material particle of claim 1, wherein the tetrahedral phase shell is formed on the area of 50% to 100% with respect to the surface area of the core.

6. The positive electrode active material particle of claim 1, wherein the lithium cobalt phosphate of the tetrahedral phase shell undergoes a phase transfer to an olivine phase at a temperature of 220° C. or higher.

7. The positive electrode active material particle of claim 6, wherein a tetrahedral phase of the lithium cobalt phosphate has higher ionic conductivity than the olivine phase.

8. The positive electrode active material particle of claim 1, wherein due to an electrochemical reaction by $Co^{2+}/Co^{3+}$ redox coupling at a potential of 4.9 V or higher, the lithium cobalt phosphate of the tetrahedral phase shell has a property of inhibiting an oxygen release phenomenon which is caused by lithium deintercalation in the lithium cobalt oxide of the core during overcharging.

9. The positive electrode active material particle of claim 1, wherein the surface of the tetrahedral phase shell is coated with $Al_2O_3$.

10. The positive electrode active material particle of claim 9, wherein a thickness of the $Al_2O_3$ coating is 5 nm to 100 nm.

11. A method of preparing the positive electrode active material particle of claim 1, the method comprising:

preparing a mixed solution in which a cobalt source, a phosphorus source, and a lithium source are mixed;

adding lithium cobalt oxide in a particle state to the mixed solution, followed by mixing to form a solution; and performing a hydrothermal reaction of the solution.

12. The method of claim 11, wherein the cobalt source is cobalt oxide or cobalt nitride.

13. The method of claim 11, wherein the phosphorus source is phosphoric acid or a salt thereof.

14. The method of claim 11, wherein the lithium source is lithium hydroxide or lithium carbonate.

15. The method of claim 11, wherein the lithium cobalt oxide is mixed so that a weight ratio of the lithium cobalt phosphate to the lithium cobalt oxide in the positive electrode active material particle prepared by the hydrothermal reaction becomes 0.1% by weight to 3.0% by weight.

16. The method of claim 11, wherein a shell of lithium cobalt phosphate having a tetrahedral phase is formed on a surface of the lithium cobalt oxide by the hydrothermal reaction.

17. The method of claim 11, wherein the hydrothermal reaction is performed at a temperature of 200° C. to 400° C. and a pressure of 1 bar to 10 bar for 5 minutes to 20 minutes.

18. A secondary battery comprising a positive electrode including the positive electrode active material particle of claim 1, a negative electrode, and an electrolyte.

19. The secondary battery of claim 18, wherein the electrolyte includes electrolyte additives, wherein the electrolyte additives include at least one of ethylene carbonate, vinyl acetate, vinyl ethylene carbonate, thiophene, 1,3-propane sultone, succinic anhydride, or dinitrile additive, and wherein the dinitrile additive is at least one of malononitrile, succinonitrile, glutaronitrile, adiponitrile, or phthalonitrile.

20. The secondary battery of claim 19, wherein the dinitrile additive is included in an amount of 5% by weight or less based on the total weight of the electrolyte.

* * * * *